United States Patent [19]

Scranton et al.

[11] Patent Number: 6,099,815
[45] Date of Patent: Aug. 8, 2000

[54] METHOD FOR REMOVING CARBONYL SULFIDE FROM FLUIDS USING CARBON MONOXIDE

[75] Inventors: Delbert C. Scranton, Chesterfield; Brian R. Kay, St. Charles, both of Mo.

[73] Assignee: The Sulfatreat Company, Chesterfield, Mo.

[21] Appl. No.: 09/274,590

[22] Filed: Mar. 23, 1999

Related U.S. Application Data

[60] Provisional application No. 60/079,888, Mar. 30, 1998.

[51] Int. Cl.$^7$ .............................. B01D 53/00; B01J 10/00
[52] U.S. Cl. .................. 423/242.1; 423/220; 423/228; 423/234; 423/437.2; 44/300; 48/198.3; 208/208 R; 210/749; 585/800
[58] Field of Search .................. 423/242.1, 437.2, 423/563, 210, 220, 228, 234; 585/800; 589/868; 210/749; 48/198.3; 44/300; 208/208 R

[56] References Cited

U.S. PATENT DOCUMENTS

| | | | |
|---|---|---|---|
| 3,728,252 | 4/1973 | Pitchford | 208/243 |
| 4,153,671 | 5/1979 | Clements | 423/244 |
| 4,290,879 | 9/1981 | Woodall et al. | 208/232 |
| 4,455,446 | 6/1984 | Brownell et al. | 585/850 |
| 4,482,529 | 11/1984 | Chen et al. | 423/243 |
| 4,524,050 | 6/1985 | Chen et al. | 423/243 |
| 4,618,723 | 10/1986 | Herrington et al. | 558/70 |
| 4,981,661 | 1/1991 | Borsboom et al. | 423/244 |
| 5,104,630 | 4/1992 | Holmes et al. | 423/242 |
| 5,480,860 | 1/1996 | Dillon | 423/228 |

FOREIGN PATENT DOCUMENTS

| | | | |
|---|---|---|---|
| 0 171 001 A2 | 2/1986 | European Pat. Off. | 423/242.1 |
| 1142339 | 2/1969 | United Kingdom | 423/242.1 |

OTHER PUBLICATIONS

Kohl et al. "Gas Purification" Gulf Publishing Co. Houston TX, 15BN. 0-87201-314-6, 4th Ed. pp. 29, 422 & 442, 1985.

"Treat propane for COS removal;" by M. B. Mick, Exxon Co., U.S.A.; *Hydrocarbon Processing* (Jul. 1976);pp. 137-142.

*Primary Examiner*—Steven P. Griffin
*Assistant Examiner*—Timothy C Vanoy
*Attorney, Agent, or Firm*—Lathrop & Gage L.C.

[57] ABSTRACT

A method is provided for removing carbonyl sulfide out of a $H_2O$-containing fluid stream, such as petrochemical vent gas, air, carbon dioxide, nitrogen and hydrocarbons, by determining how much carbon monoxide is present in the fluid stream; adding carbon monoxide to the fluid stream to obtain a carbon monoxide to carbonyl sulfide volume ratio of at least 1:1 and to also convert the carbonyl sulfide into hydrogen sulfide and carbon dioxide, and passing the hydrogen sulfide containing fluid through a hydrogen sulfide removal system, so as to obtain a fluid substantially free from carbonyl sulfide and hydrogen sulfide.

10 Claims, No Drawings

METHOD FOR REMOVING CARBONYL SULFIDE FROM FLUIDS USING CARBON MONOXIDE

This application claims the benefit of U.S. Provisional Application No. 60/079,888 filed Mar. 30, 1998.

FIELD OF INVENTION

The present invention relates to a method for removing carbonyl sulfide (COS) from fluids, wherein the method includes adding an amount of carbon monoxide (CO) to the contaminated fluid stream. Often the CO will react with COS to form $H_2S$ so that it is preferred to then pass the fluid stream through a metal oxide bed, which causes removal of the $H_2S$ from the contaminated fluid.

BACKGROUND OF INVENTION

Fluids, such as carbon dioxide ($CO_2$) gas, often contain an amount of a reactive sulfur compound, such as a carbonyl sulfide (COS), a hydrogen sulfide ($H_2S$), mercaptans (RSH), or combinations thereof, which is undesirable. Carbon dioxide gas, nitrogen gas, natural gas liquids, and other fluids contaminated with reactive sulfur compounds are often commercially unacceptable and cannot be sold until the contaminant sulfur compounds have been substantially removed. In fact, most commercial purchasers of natural gas or other fluids or gases, for example, will not purchase gas from the gas producer unless the contaminant sulfur compounds are below a certain specified number. This is because when gasoline, for example, is formed, synthesis catalysts are used; however, synthesis catalysts are extremely sensitive to sulfur. As such, it is desired to remove the contaminant sulfur compounds from the various fluids such as carbon dioxide ($CO_2$) gas.

It is known that $H_2S$ and RSH can be readily removed from different types of fluids by passing such fluids through, for example, an iron oxide bed that is reactive with $H_2S$ and RSH. However, COS is generally not very reactive with the iron oxide bed materials or other metal oxide materials. When fluids contaminated with COS are passed through a metal oxide bed, generally very little, if any, of the COS will be removed from the $CO_2$ gas or other fluid, especially at temperatures below 3000 F. This is problematic because not only is COS a contaminant, but with the passage of time the COS will hydrolyze into $H_2S$, which is considered a highly undesired sulfur contaminant. Thus, it is desired to have a method or composition for removing COS from a fluid because COS is considered a contaminant and because COS will convert to $H_2S$ which is considered a particularly undesirable contaminant.

The conversion rate of COS to $H_2S$ can be very slow, often taking at least a few weeks. It is known that COS can be converted to $H_2S$ if an elevated temperature above ambient temperatures is used. As such, typically COS is removed from a fluid by using a high temperature removal process, with such removal process generally being difficult to perform and expensive to use. Even with the known high temperature removal processes, prior removal methods have not been very successful in removing a sufficient amount of COS from a fluid. Thus, it is desired to have a method that is less expensive, does not involve elevated temperatures, can be performed under ambient conditions, will cause the conversion in a short period of time, and that is easy to perform.

A method for removing COS under ambient conditions was disclosed in U.S. Pat. No. 4,290,879 ('879 patent). The method disclosed mixing a fluid stream with methanol, followed by passing the stream through a bed of potassium hydroxide (KOH). While this method worked it suffers from a couple of different problems. First, the use of methanol can be dangerous because it is highly flammable. This method involves the use of a hazardous compound, methanol, which is undesired. Also, the method requires the formation of a KOH bed which is typically not used in the sulfur removal industry. As such, the costs arc increased in this method because a bed that is not typically used must be formed. For these reasons it is desired to have a method that is not very hazardous, is economical, and that can be used with existing sulfur removal equipment. It is further desired to develop a method that does not always require a second treatment step, meaning a method whereby the COS is not converted to another contaminant that must then be removed. Instead it is desired to have a method whereby on occasion the COS is simply eliminated without a further step required to remove a newly formed contaminant.

Another method for removing COS from a fluid stream involves catalyzing COS to $H_2S$ using a cobalt-molybdenum catalyst. The cobalt-molybdenum catalyst is operated at a temperature ranging between 500° and 750° F., a pressure ranging between 100 and 500 psig, and a space velocity ranging between 500 to 1.500 cubic feet per hour. After the reaction occurs, then the fluid must be passed through a metal oxide in order to remove the $H_2S$, which has been catalyzed from the COS. This method suffers from a number of problems, including the fact that cobalt is used, which is considered an extremely hazardous compound. Elevated temperatures are used which is also undesirable. Additionally, this method can be cost prohibitive.

As can be seen, it is difficult to thoroughly and inexpensively remove COS from fluids. Thus, it would be desirable to have a cost effective and efficient system for removing COS from various fluids, especially $CO_2$ gas, without having to heat the fluids or any other part of the reaction system. It is also desired to have a safe and economical method for removing COS from fluids.

SUMMARY OF INVENTION

The present invention relates to a method for removing reactive sulfur compounds, in particular, carbonyl sulfide (COS), from fluids, especially gas streams, whereby the method is comprised of adding carbon monoxide (CO) to a fluid stream. More specifically, the present invention relates to adding an amount of carbon monoxide (CO) to a fluid stream contaminated with COS. Frequently, the CO will react with the COS to most likely form $H_2S$, so that optionally the present method will include steps for removing $H_2S$. If the $H_2S$ or RSH has been formed in the fluid stream, then the fluid stream can be treated according to traditional sulfur contaminate removal methods.

To perform the present method it is necessary to first determine the amount of COS that is found in the contaminated fluid stream. Once the amount of COS has been ascertained, the CO will be added in an amount equal to between at least a 1:1 and a 5:1 by volume ratio of CO to COS. The method is preferably conducted under ambient conditions, including both ambient temperature and pressure. It is necessary for the CO to be added to the fluid stream prior to passage into a metal oxide system or other type of system designed to remove sulfur contaminants other than COS, for example if it is necessary to remove $H_2S$.

The present invention is advantageous because previously it has been known to be difficult to remove COS from a fluid stream, especially under ambient conditions. This method is also advantageously easily performed, and is relatively inexpensive and safe. The present invention is comprised of adding an amount of CO to the fluid stream, whereby the CO will react with the COS to either produce a more removable sulfur contaminant or the COS will simply be eliminated. Most importantly, the present method readily eliminates COS contaminants from the fluid stream with it observed that the present method results in the elimination of at least 50% of the COS contaminants in the fluid stream, more preferably 80%, and, more likely, 95% to 100% of the COS contaminants are eliminated.

DETAILED DESCRIPTION

The present invention relates to a method for removing reactive sulfur compounds, in particular carbonyl sulfide (COS), from fluids, including carbon dioxide ($CO_2$) gas, nitrogen gas, and natural gas liquids. The method includes adding an amount of carbon monoxide (CO) to the contaminated fluid being treated followed by preferably passing the fluid treated with the CO through a metal oxide bed, preferably an iron oxide bed, if the COS is converted to another contaminant sulfur compound, such as $H_2S$. Addition of the CO to the fluid stream will typically cause the COS to convert to $H_2S$ and $CO_2$, with the $H_2S$ then easily removed using known standard methods such as passage through a metal oxide (MeO) bed, such as an iron oxide ($Fe_xO_y$) bed. The reaction typically can be illustrated as follows:

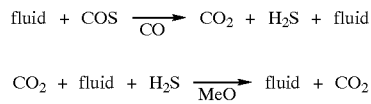

However, on occasion the reaction can be illustrated as follows:

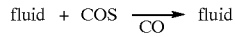

If this is the case, then passage through an MeO bed, for example is not required.

The present method is initiated by adding an amount of CO to any of a variety of fluids, including gases and liquids so as to cause removal of the COS from the fluids. The fluids or fluid stream can be selected from any of a variety of fluid species including, but not limited to, $CO_2$ gas, nitrogen gas, and hydrocarbon fluids, as well as, other liquids and gases containing COS. Among the specific types of hydrocarbon fluids that can be treated with the present method are refinery or petrochemical vent gas, natural gas, natural gas liquids, petroleum fluids, gasoline, liquid petroleum, liquid petroleum gas, diesel fuel, kerosene, glycols, and any other hydrocarbon fluid that has COS and can be potentially treated for $H_2S$ removal downstream.

In order to add a sufficient amount of CO to cause removal and/or conversion of the COS, the average amount of COS in the fluid stream must first be determined. This can be accomplished by using a variety of devices or instruments. An example of a suitable device is a SENSIDYNE® stain tube.

The SENSIDYNE® stain tube is a product which can be used to detect over 240 substances. In the present case, a SENSIDYNE® tube can be purchased that detects COS and determines the amount of COS in the fluid.

After determination of the amount of COS in the fluid stream, the CO is added to the COS contaminated fluid in a ratio equal to at least about 1:1 parts by volume of CO to COS in the contaminated fluid. It is even more preferred to add the CO in a ratio equal to between about 5:1 and about 10:1 parts by volume of CO to COS in the contaminated fluid. When the CO is added to the contaminated fluid, the CO will react with the COS to either convert the COS into $H_2S$ or to eliminate the COS so that it is no longer detectable. Typically, however, the fluid stream will contain $H_2S$ instead of COS and will still be considered contaminated. If the $H_2S$ is present, it can then be easily removed from the fluid stream by passing the fluid contaminated with $H_2S$ through, for example, a metal oxide (MeO) bed, whereby the MeO will react with the $H_2S$ to eliminate the $H_2S$.

The CO can be added to the fluid stream at any temperature; however, it is most preferred to use the CO to remove COS at temperatures equal to or below 300° F. It is even more preferred to use the CO to eliminate the COS at ambient temperatures. Also, the conversion of COS can occur at any pressure with it preferred for the reaction to be conducted under ambient conditions. The CO, when added, will typically be in a gaseous state regardless of the particular fluid state.

As mentioned, to remove the $H_2S$ from the contaminated fluid, especially $CO_2$, the fluid will be passed through an amount of MeO, preferably either iron oxide ($Fe_xO_y$) or zinc oxide (ZnO), generally found in a reactor vessel or bed. More generally, the reactor bed will contain an amount of metal oxide, with the metal oxide selected from the group consisting of iron oxide, zinc oxide, and combinations thereof. Other row 4 and row 5 metal oxides can be used, but the iron and zinc oxides are most preferred. The most preferred metal oxide is iron oxide of the formula $Fe_xO_y$, whereby x is equal to between 1 and 3 and y is equal to between 1 and 4. As such, the iron oxide is selected from the group consisting of FeO, $Fe_2O_3$, $Fe_3O_4$, and combinations thereof. The metal oxide can be in a slurried, liquid, or solid form, with the solid form including, extruded metal oxide, pelletized metal oxide, and the placement of the metal oxide on an inert carrier. The metal oxide will be housed in a standard reactor bed, which was disclosed in previous patent applications filed by SULFATREAT™ with such applications incorporated herein by reference. Obviously, the carbon monoxide (CO) must be added to the $CO_2$ or fluid prior to contact with the MeO.

The metal oxide will react with the reactive sulfur contaminants, especially $H_2S$ and RSH, and will remove the sulfur contaminants from the fluid stream. Also, the fluid can pass through the metal oxide in liquid or gaseous form, so that the liquid can pass over an amount of solid metal oxide or be mixed with an amount of slurried metal oxide and then separated from the metal oxide. If the fluid is in gaseous form it can be bubbled through the slurried metal oxide. As such, a fluid stream is produced that has substantially all of the sulfur compounds removed therefrom.

While it is preferred to use metal oxides to remove the $H_2S$ and RSH, any hydrogen sulfide removal process can be used. Instead of metal oxide, the $H_2S$ and RSH removal method can include regenerative neutralizing amines such as, monoethanol amine (MEA), diethanol amine (MDEA), as well as glycol absorbers, activated impregnated carbon, and caustic treaters (NaOH or KOH) which are solid or liquid, reactive amines or triazines, amine/aldehyde condensates, formaldehydes, other common $H_2S$ and RSH removal processes, and combinations thereof.

The present method can optionally include a step whereby the fluid is preferably saturated with an amount of water (H₂O). This step is optional and preferred, but not required. It is believed that the $H_2O$ helps to increase the reactivity of the COS with the CO. The $H_2O$ is preferably added in an amount sufficient to saturate the fluid; however, it is believed that very little moisture or $H_2O$ is required for the conversion of the COS to $H_2S$. Some moisture is required in the fluid, but the fluid does not have to be saturated with moisture so that it is only required that the fluid not be desiccated. When the $H_2$ is added, it can be in gaseous or liquid form. The $H_2$ can be added prior to the addition of the CO to the fluid or can be added after the addition of the CO to the contaminated fluid. Importantly, the $H_2O$ must be added prior to the passage of the fluid through the MeO.

Once the water has been added to the fluid stream, if there is an excess amount of water present in the fluid stream it can be passed through a separator which will remove the excess water from the saturated fluid stream. The separator is a device that works by removing excess water from the fluid stream and results in a fluid stream that is sufficiently saturated with $H_2O$.

The excess water used to saturate the fluid stream can be removed before the amount of carbon monoxide (CO) is added thereto. The CO is added in gaseous form to the fluid stream prior to or after the addition of liquid, if the liquid is added. It should be pointed out that the saturation of the fluid stream is optional. The only critical step is the addition of the CO to the fluid, in particular the $CO_2$ stream.

While the COS is the reactive sulfur contaminant, the present invention is also directed towards other sulfur contaminants believed to be removed by the present method, including hydrogen sulfide ($H_2S$) and/or mercaptans (RSH).

The following Examples are for illustrative purposes only and are not meant to limit the claims in any way.

EXAMPLES

Example 1

A test involving treating $CO_2$ gas contaminated with COS was performed. A reactor chamber was made of PVC pipe, with the chamber having an iron pipe valve on the inlet and iron pipe nipple on the outlet. The PVC pipe or column reactor had a four (4) inch diameter and a four (4) foot length. Attached to the inlet and outlet, on the ends of the column, was tygon tubing. A $CO_2$ gas stream was passed through the reactor, with the stream comprised of approximately 125 parts per million (ppm) by volume of carbonyl sulfide, 125,000 ppm by volume of $CO_2$ and the remaining balance was nitrogen. The reactor had eight (8) inches of water located therein, so that the reactor contained the nitrogen gas, the carbonyl sulfide, water, and an amount of $CO_2$.

To the water, nitrogen, $CO_2$, carbonyl sulfide mixture approximately 2000 ppm by volume of carbon monoxide was added. It was observed that the addition of the carbon monoxide resulted in the reduction in the amount of carbonyl sulfide from 125 ppm to 15 ppm by volume. The flow rate of carbon monoxide into the reactor was approximately 25 ml/sec. The water was drained and the carbonyl sulfide level was again taken from the nitrogen gas, it was found that the amount of carbonyl sulfide did not change.

Example 2

To ensure that the carbon monoxide of Example 1 was the cause of the conversion of the COS, the carbon monoxide was turned off and the carbonyl sulfide levels were again measured. It was found that the amount of carbonyl sulfide in the $CO_2$ gas returned to its original level of 125 ppm by volume.

Example 3

Next, the carbon monoxide was turned on again and mixed with a nitrogen Gas stream contaminated with carbonyl sulfide the same as Example 1, without the water in the reactor. It was found that the carbonyl sulfide level in the nitrogen gas dropped to 12 ppm by volume.

Example 4

To further verify the test of Example 1, two streams of unknown flowrate were combined so that one stream was comprised of a nitrogen and carbonyl sulfide mix, with the mix containing about 1000 ppm by volume of carbonyl sulfide. The other stream was 99% pure carbon monoxide. When the two streams were mixed it was observed that there was 0 ppm by volume of carbonyl sulfide and 30 ppm by Volume of hydrogen sulfide. Thus, it is believed that the tests of Examples 1–4 conclusively show that when carbon monoxide is added to a fluid stream contaminated with carbonyl sulfide, the carbonyl sulfide levels in the fluid stream will be reduced.

Example 5

The following test on a $CO_2$ gas stream was conducted with the following conditions present:

Inlet COS 190 ppm as determined by a Sensidyne #21 stain tube (no sensitivity to CO reported)
Inlet CO 0.1% as determined by a Sensidyne 1M stain tubes before added CO injection
Temperature 200° F., water saturated
Pressure 200 psi
Flow Rate 5,000 standard cubic feet per day
No $H_2S$ or RSH detected on the inlet
The demonstration towers were four (4) inches in diameter and four (4) feet in height
The results were as follows:

| Condition | #1 Inlet | #2 COS in ppm After First Unit | After Second Unit | CO in ppm |
| --- | --- | --- | --- | --- |
| After 30 minutes Without added CO | 190 ppm | 30 ppm | 25 ppm | 1000* |
| With CO added | 190 ppm | 0 ppm | 0 ppm | 2500* |

*Higher than normal CO found in the feed gas.

As can be seen, the addition of the CO caused the removal or conversion of the COS. Without the addition of the CO, some of the COS was removed from gas as a result of passage through a reactor unit containing iron oxide. It should be noted, however, that the removal or conversion of the COS was not complete.

Thus, there has been shown and described a novel method relating to the use of carbon monoxide with fluid streams contaminated with carbonyl sulfide to remove the carbonyl sulfide which fulfills all the objects and advantages sought therefore. It is apparent to those skilled in the art, however, that many changes, variations, modifications, and other uses and applications for the subject method are possible, and also such changes, variations, modifications, and other uses and applications which do not depart from the spirit and scope of the invention are deemed to be covered by the invention which is limited only by the claims which follow:

What is claimed is:

1. A method for removing carbonyl sulfide out of a fluid stream selected from the group consisting of $H_2O$- containing petrochemical vent gas, H$_2$O-containing air, H$_2$O-containing carbon dioxide gas, H$_2$O-containing nitrogen gas and H$_2$O-containing hydrocarbon fluids, consisting essentially of the steps:

(a) determining how much carbonyl sulfide is present in the fluid stream;

(b) adding an amount of carbon monoxide to the fluid stream so as to obtain a carbon monoxide to carbonyl sulfide volume ratio of at least 1:1 present in the fluid stream so that the carbon monoxide converts the carbonyl sulfide into carbon dioxide and hydrogen sulfide, and (c) passing the hydrogen sulfide-containing fluid through a hydrogen sulfide removal system to form a fluid substantially free from carbonyl sulfide and hydrogen sulfide.

2. The method of claim 1, wherein said H$_2$O-containing hydrocarbon fluids are at least one member selected from the group consisting of H$_2$O-containing natural gas, H$_2$O-containing liquefied natural gas, H$_2$O-containing gasoline, H$_2$O-containing diesel fuel, H$_2$O-containing kerosene and H$_2$O-containing glycols.

3. The method of claim 1, wherein the amount of carbon monoxide added to the fluid stream is such that the carbon monoxide to carbonyl sulfide volume ratio in the fluid stream is in the range of about 5:1 to about 10:1.

4. The method of claim 1, wherein s aid method is conducted under ambient conditions.

5. The method of claim 1, wherein said method is conducted at a temperature of less than 300° F.

6. The method of claim 1, wherein at least 50% of the carbonyl sulfide is removed from the fluid stream.

7. The method of claim 1, wherein the hydrogen sulfide removal system utilizes at least one member selected from the group consisting of metal oxides; amines; metal hydroxides and activated impregnated carbon.

8. The method of claim 7, wherein the metal oxides are selected from the group consisting of iron oxide and zinc oxide.

9. The method of claim 7, wherein the amines are selected from the group consisting of monoethanol amine, diethanol amine and monodiethanol amine.

10. The method of claim 7, wherein the metal hydroxides are selected from the group consisting of liquid sodium hydroxide, solid sodium hydroxide, liquid potassium hydroxide and solid potassium hydroxide.

* * * * *